United States Patent [19]

Ciaperoni et al.

[11] Patent Number: 4,873,296

[45] Date of Patent: Oct. 10, 1989

[54] POLYAMIDE POLYETHYLENE GLYCOLPOLYAMIDE BLOCK COPOLYMER

[75] Inventors: Aldemaro Ciaperoni, Bollate; Alberto Cappelli, Cogliate; Francesco D'Andolfo, Cesano Maderno; Antonio Salan, Saronno, all of Italy

[73] Assignee: SNIA Fibre S.p.A., Cesano Maderno, Italy

[21] Appl. No.: 688,148

[22] Filed: Dec. 31, 1984

[30] Foreign Application Priority Data

Dec. 30, 1983 [IT] Italy ................................ 24455 A/83

[51] Int. Cl.$^4$ ............................................. C08G 69/48
[52] U.S. Cl. ..................................... 525/434; 525/420; 528/336
[58] Field of Search ................................ 525/434, 420

[56] References Cited

U.S. PATENT DOCUMENTS

4,361,680 11/1982 Borg et al. ........................... 525/434
4,556,697 12/1985 Curatolo et al. .................... 525/434

OTHER PUBLICATIONS

Hay, U.S. Pat. No. 3,306,875, cols. 1-2, 35-36.

*Primary Examiner*—Harold D. Anderson
*Attorney, Agent, or Firm*—Wenderoth, Lind & Ponack

[57] ABSTRACT

A linear block copolymer of regular structure, comprising polyamide and polyethylene glycol blocks. Two polyamide blocks (A) are bound through an intermediate polyethylene glycol block (B) according to a structural scheme (A-B-A). Fibers exhibiting a high moisture absorption strong mechanical properties and a high dyeability. Textile manufactured goods comprising said fibers. A process to obtain said block copolymer, through the preparation of a polyamide (A) and a polyethylene glycol (B), and condensation of polyamide (A) and polyethylene glycol (B) so as to obtain a (A-B-A) structure.

9 Claims, No Drawings

POLYAMIDE POLYETHYLENE GLYCOLPOLYAMIDE BLOCK COPOLYMER

PRIOR ART

It is known that the presence of hydrophilic substances is necessary to make polyamide 6 hydrophilic when used in the field of fibers. Among said hydrophilic substances, polyethylene glycol (PEG) and polyethylene oxide are by far the most used, the latter having the advantage that it is widely used in the industry and inexpensive. Techniques to add PEG to polyamides generally, including polyamide 6, are:

(a) plain addition thereof to the molten and stirred polyamide, so as the favor blending; such a method, however, has the disadvantage that PEG does not chemically bind to polyamide, or, if chemical bounds do form, as some literature maintains, they are merely static and disorderly in nature and their formation is uncontrollable, so that, in any event, the copolymer properties are poor, and besides PEG is extracted by possible extended contact with water when hot, thus losing the hydrophilic character conferred by the polyamide. All this specially applies to polyamide as a textile, when dyeability is required and the dyeing process takes place in water under heat;

(b) addition of the polyamide monomer or comonomers (diacid-diamine salts, lactams) prior to polymerization, caprolactam being used in the case of polyamide 6; in such an instance PEG may react during polymerization in the molten state, binding to polyamide macromolecular chains. As an aid to the reaction by which a polyamide becomes bound to PEG, both are to be made susceptible to reaction.

The known art teaches that susceptibility to reaction in the case of the above techniques is acquired through the following roads:

(1) increasing the number of polyamide amino groups and reacting said groups with carboxy groups of properly modified PEG. Such a reaction, however, has a disadvantage in that carboxy groups are heat-unstable, so that conversion in the polyamide/PEG reaction is rather slight;

(2) increasing polyamide carboxy groups and reacting these terminal groups with PEG terminal amino groups (it is a fact that a PEG containing amino groups instead of the usual hydroxy groups is commercially available, Texaco Corp.). The known art makes reference to the following patents: U.S. Pat. No. 3594266, UK 108812, U.S. Pat. No. 3946089, U.S. Pat. No. 3509106, U.S. Pat. No. 3558419, U.S. Pat. No. 3639502, U.S. Pat. No. 3514498, U.S. Pat. No. 3661510, U.S. Pat. No. 3549724;

(3) increasing the number of polyamide carboxy groups, which can react polyesterifying with PEG hydroxy groups. Preformation of the polyamide with carboxy terminal groups, which subsequently react with normal PEG, is an alternative to this technique.

Polycondensation takes place in the presence of titanium, zirconium or hafnium catalysts in a high vacuum condition (U.S. Pat. No. 4331786, UK 2093469, U.S. Pat. No. 4349661, U.S. Pat. No. 4345052, U.S. Pat. No. 4345064, U.S. Pat. No. 4252920; U.K. 1473972).

Leaving out technique (a), which is devoid of actual practicability, techniques (b) lead to formation of "block" copolymers.

Blocks consist of macromolecural polyamide and polyethylene glycol fragments of different MW (and different from one another); in particular, distributions of "blocks" inside the macromolecular chains occur at random. In fact PEG with modified or unmodified terminal groups (instances b. 1, b. 2) is added together with the polyamide monomers (caprolactam when polyamide 6 is being modified). Therefore, naming A the blocks of a whatsoever polyamide and naming B the PEG blocks terminating with hydroxy or various terminals, the distribution of A and B blocks has no foreordained arrangement. Concerning b. 3 instance, that A and B sequency may be random or prestablished, as specified hereinafter.

As previously stated, the presence of PEG makes homo- and co-polyamides more or less hydrophilic, according to PEG amounts employed.

Such a property is generally welcome when polyamide is used in the textile field: a disadvantage exists, however, to the use of PEG-modified homo- or copolyamides to be employed in fibers, and such disadvantage is that mechanical and textile properties (elastic modulus, shrinkage, elongation, etc) are poorer in modified fibers as in respect to non modified polyamide or copolyamide fibers.

The lowering of properties is heavier when the hydrophilic character of the modified fiber is stronger and therefore water sorption capability is higher.

The problem is that the known art cannot supply PEG-modified polyamides or copolyamides for use in the field of fibers, having mechanical and textile properties comparable to those of polyamide per se for any amount of water sorbed by the modified fiber. Filaments comprising PEG-modified nylon 6 having a modulus comparable to that of conventional nylon 6 fiber are disclosed in U.S. Pat. No. 3,593,266, but the disclosed filament is a composed one of the "sheath-core" type, that is a filament having a concentrical rings cross-section, wherein a block copolymer component is associated to a conventional polyamide that is present in prevailing amounts.

It is an object of this invention to provide polyethylene-glycol-modified polyamide or copolyamide polymers suitable to production of fibers, filaments and textile manufactured goods, combining good mechanical and textile properties (that can be compared to those of unmodified polyamide) to the hydrophilic character that is present in all thus modified polyamides.

It is a further object of this invention to provide a process for the preparation of said polymers, through which they can be obtained with the proper structure and inherent properties, in a controlled and orderly way.

It is a still further object of this invention to provide polymers of the above type and a process for the preparation thereof, consenting to obtain fibers, filaments and textile manufactured goods having a high degree of dyeability beside a hydrophilic character and high-rate mechanical and textile properties.

SUMMARY OF THE INVENTION

We have now unexpectedly found that the above objectives can be reached through the provision of a regular structure linear block copolymer comprising polyamide and polyethylene glycol blocks, characterized in that it comprises two polyamide blocks (A) bound through an intermediate polyethylene glycol block (B), according to the structural scheme (A-B-A).

According to an aspect of the invention, the polyamide blocks should have an average molecular weight of 5,000 to 15,000, and preferably of 7,000 to 12,000, while the polyethylene blocks should have an average molecular weight of 600 to 10,000, preferably of 1,000 to 5,000.

The block copolymer (A-B-A) has terminal amino groups combined in the form of salts so as to make them capable of capturing a dye during the coloring process.

The block copolymers of the invention have a relative viscosity of between 2.1 and 2.7, preferably between 2.2 and 2.5.

As a rule, the bond between a polyethylene glycol block and the adjoining polyamide blocks may be either an ester bond, that is a bond coming from the reaction of a carboxy and an hydroxy group, or an amide bond, that is a bond coming from the reaction of a carboxy and an amino group. (The starting polyethylene glycol has terminal hydroxy or amino groups.)

According to the invention, the preferably used polyamide is polycapronamide (also name polyamide 6 or nylon 6), which is usually obtained through polymerization of caprolactam.

Fibers and filaments having high mechanical properties in addition to high moisture sorption and high dyeability are obtained from the invention copolymers adopting known melt spinning methods. Such high physical and mechanical properties of fibers and filaments of the invention are detailed as follows.

Moisture sorption on the fibers is a function of the amount of PEG that is present in (A-B-A) copolymers: with PEG amounts of between 6 and 9%, the moisture content (as determined after saturation at 20° C. and 95% relative moisture) is of 13–17%, instead of 8–9% as in regular nylon 6.

The elastic modulus is similar to nylon 6 and higher than other fibers fibers prepared according to known art (examples 1 and 2).

Besides, dyeability is equal or better than for conventional nylon, according to conditions and amounts of molecular weight regulators introduced during polymerization.

The invention process for the preparation of block copolymers, which are also included in the scope of the invention, fundamentally comprises the steps of: preparation of a polyamide of molecular weight within the above specified limits; preparation in the presence of polyethylene glycol of molecular weight within the above specified limits, and condensation thereof in the intended stoichiometrical ratios leading to the realization of a (A-B-A) structure, in the presence of a catalyst such as hereinafter defined. The starting polyethylene glycol may have terminal hydroxy or amino groups, and final condensation conditions are dictated by the structure thereof. Specifically, if the polyethylene terminal groups are hydroxy, polymerization should take place under high vacuum.

The polyamide component is prepared by polymerization of the monomer, in particular caprolactam, in the presence of at least one, preferably at least two, molecular weight regulators. Such regulators must, above all, establish the molecular weight of the polyamide that will be a component of the invention block copolymer, so that it remains within the aforementioned boundaries. Further, molecular weight regulators, or at least one of them, must perform in such a way as to consent that a regular (A-B-A) structure be obtained. To this end, polyamide must have one reactive terminal group only, when condensing with polyethylene glycol, inasmuch as in this way a polyethylene glycol molecule having two reactive terminal groups will bind to each of the two polyamide terminals, so that continuation of the polymerization process will be impossible and the desired structure is obtained. Under different conditions and if disregarding such stated "must" the resulting polymer would not be regular, condensation might continue or develop according to random schemes, with production of a random polymer, devoid of the expected properties, so that the problems that the invention does solve would not in fact be solved.

On the basis of such criteria, one of the two molecular weight regulators is preferably selected among monocarboxy acids (D) having an acid dissociation constant ($K_a$) of between $10^{-5}$ and $10^{-4}$; with acetic, propionic, capronic, benzoic and methylbenzoic acid being suited to the purpose, among others. The second monoacid component must have a first dissociation constant $K_a$ of higher than $10^{-2}$; to this series of acids (F) belong such inorganic and organic acids are e.g. naphthalenesulfonic acids and benzene sulfonic, phosphoric, hydrochloric and phosphorous acid.

Together, (D) and (F) should amount to 50–200 moles/$10^6$ g of caprolactam, preferably 90–150 moles/$10^6$ g of caprolactam, and the two reactants may be added separately or in the form of a mixture. Specifically, the amount of (D) component should be 20–170 equiv/$10^6$ g, preferably 60–120.

The polymerization medium includes caprolactam and water, the latter in an mount of 1–10% by weight, preferably 2–5% by weight of the former, beside (D)+(F).

The polymerization cycle undergone by caprolactam (in a suitable, stirred vessel) in the presence of water is well known in the art. The reaction mixture is heated to 240°–260° C. under 1–15 atm of autogenous pressure. Then, depressurization of the autoclave is effected. When the atutoclave is back to atmospheric pressure, polyethylene glycol component (B) is added with stirring under a slight nitrogen flow or a slight negative pressure. Polyethylene glycol, if hydroxy-terminated, will be present in such an amount that PEG hydroxy groups are in a stoichiometric amount as in respect to carboxy polyamide groups. This criterion also applies if PEG is amino-terminated. Therefore the number molecular weight of molten polyamide 6 (A) should be such that it reacts with PEG (B) according to the following reaction:

PA—COOH+HO-PEG-OH+HO CO PA

PA COO PEG-O CO PA [(A-B-A) structure of the blocks]   (1)

As a rule, obtained molecular weights will be between 5,000 and 15,000, preferably between 7,000 and 1,2000, depending upon amounts of (D)+(F) used. PEG average molecular weights are of between 600 and 10,000, preferably between 1,000 and 5,000. Therefore copolyamide (A-B-A) average molecular weight can be at most of between 11,000 and 40,000, preferably between 15,000 and 29,000. However, said molecular weights may in the practice be lower than stated, because a 100% conversion of —COOH and —OH groups to ester groups is unnecessary; in other words, it is mandatory the amount of (A-B-A) sequence be higher than 45% of the theoretical value.

Said conversion to (A-B-A) can be independent of the amount of PEG contained in the polymeric composition, which is generally between 5 and 10% (mass/composition mass), preferably between 6 and 9%.

As better specified hereinafter, esterification reaction takes place under severe conditions: a residual pressure of lower than 2 mm Hg and the presence of a suitable catalyst, at temperatures higher than polyamide 6 melting point (230°-260° C.).

Under such conditions, esterification would be impossible, were not the present amino groups be "blocked" by (F), which prevents them from condensing with polyamide 6 carboxy terminal groups (as previously explained).

In the absence of any blocking of the amino groups (through formation of salts), a very high molecular weight would be obtained of polyamide 6, containing chemically unbound PEG. Therefore, reaction (1) can be re-written as follows:

wherein $R^-.H^+$ stands for a strong series (F) acid.

To be more precise, the esterification reaction takes place preferably:

(a') under stirring, so as to disperse PEG into preformed nylon 6;

(b') under high vacuum, generally at a residual pressure lower than 1-2 mm Hg, so as to favor a polyesterification equilibrium, since an amidation equilibrium is prevented according to the invention.

Reaction conditions appearing under (a') and (b') are obvious and they are mentioned in the known art: concerning the catalysts, the known art claims the use of titanium tetraderivatives (alkoxides)-(U.K. 1473972, U.K 1518060, U.K 2011450, U.S. Pat. No. 4331786, U.S. Pat. No. 4345052, U.S. Pat. No. 4252420) or zirconium tetraderivatives (U.K. 2093469, U.K. 2011450).

Tetravalent hafnium derivatives (alkoxides may also be used, but they have the drawback of a high cost.

Other catalysts consisting of organic or inorganic acids (benzenesulfonic, hydrochloric and phosphoric acid) are employed, but their efficiency is low; zinc or antimony compounds can also be used in a polyesterification between (A) and (b) blocks, with the disadvantage, however, that the catalyst may undergo reduction and yield the free metal (gray); besides, their catalytic activity is unsatisfactory.

We have experimentally confirmed, according to the known art, that tetravalent titanium, zirconium and hafnium derivatives are active esterification catalysts; they show however two drawbacks that limit or even prevent their use when the (A-B-A) compositions of this invention are meant for use in the textile field.

A first drawback is the high molten state viscosity of the reaction mixture even at low percentages of (A-B-A) structures. A high molten state viscosity (beyond 6,000 poise at 250° C.) is deleterious because:

(1) it implies high spinning temperatures of the (A-B-A) compositions, leading to a deterioration of both color and mechanical-textile properties of the resulting filament;

(2) it makes the spinning process impracticable because of the presence of gelled particles, thus aggravating the existing disclosed problems. Gel formation is quite evident when polyesterification conversion goes beyond 70%, and it is caused by branched and crosslinked structures due to the presence of four active functions in the catalyst:

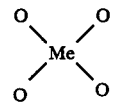

A second drawback is a color formation in the polymer (amide-ester), which is especially related to the presence of tetraalkoxy titanium; obviously, if the polymer is colored to start with, spinning increases the yellow color.

We have now unexpectedly found that, limiting the number of active functions of the catalyst to two, molten viscosity of the material is lower, at an unchanged value of conversion to (A-B-A) structures, and, consequently, of the number molecular weight of the material. In other words, the macromolecular is bidimensional instead of tridimensional.

This finding makes spinning and subsequent stretching operations easier, affording textile properties comparable to those of nylon 6 filament.

Poise viscosity, when operating with such catalysts and under conditions that are described hereinafter, is of between 1,000 and 5,000 poises, a preferred one being of between 1,500 and 4,000 poises with a conversion to (A-B-A) of 45 to 75%. On the contrary, when employing a tetrafunctional catalyst at a similar percent conversion to (A-B-A), viscosity is of 6,000 to 14,000 poises.

Suitable catalysts, according to our findings, explanations and claims, consist of a compound of formula $OMe(OR)_2$, wherein Me can be Ti, Zr or Hf, and R is alkyl, aryl, acyl, aroyl, carboxy-acyloyl, carboxy-aroyl (carboxy groups bound to the acyl or aroyl group may be in the form of alkali or alkaline earth metal salts).

Amounts of catalyst employed range from 0.05 to 0.5%, based on the whole reaction mass.

As said before, and alternative to esterification reaction with hydroxy-terminated PEG and a catalyst is to be found in a reaction with amino-terminated PEG, and in this case use of a cataylst is superfluous, but the spun composition will have the same composition and property characters when operating with the invention procedure where a (A-B-A) structure is realized after properly converting precursor-nylon amino groups to salts.

Here follows a description of analytical methods employed for a determination of the indicated variables.

DETAILED DESCRIPTION OF THE PREFERRED EMBODIMENTS

Relative viscosity

The polymer relative viscosity is measured by the ratio of the downflow time for a 1% solution of the polymer in 97.5% sulfuric acid to the downflow time for said sulfuric acid per se. A Ubbelhode viscosimeter is used for the measurements.

Free amino groups

Free amino groups are determined by acidimetric titration of a solution of the polymer in a phenolmethanol solution. As an end point indicator use can be made of thynol blue or of a conductimeter.

Total amino groups

Total amino groups are determined dissolving the polymer in phenol, precipitating it by the addition of a water-acetone mixture, drying the precipitated polymer and titrating total amino groups as specified for free amino groups.

Carboxy groups

Carboxy groups are determined by alkalimetric titration on the polymer dissolved in benzyl alcohol. Phenolphthalein is used as an indicator.

Polyethylene glycol content

Polyethylene glycol content is determined by a thiosulfate titration of the iodine set free when the polymer is dissolved with warning in phoshoric acid and and sodium iodide.

Poise viscosity

Poise viscosity is determined with a Melt indexer apparatus as described on ASTM D1238-S7T at 260° C., with a 0.1035 cm radius and 2 cm length capillary, at a speed gradient at the walls ($\gamma$) $\leq 10$ sec$^{-1}$.

Tinctorial absorption to saturation

The amount of dyeing matter absorbed onto the fiber is determined using a pH 4, with a 2% solution of Orange II (Sandoz).

Saturation moisture

A sample of previously dried filament is kept in a conditioned (t=20° C., relative moisture=95%) surrounding until it reaches a constant weight. Saturation moisture content is determined by weight difference.

EXAMPLE 1

Preparation of a hydrophilic copolyamide having orderly (A-B-A) groups according to the invention. The formed thread properties are comparable to those of a regular polyamide thread, except that it shows a higher moisture sorption.

113 parts caprolactam, 3.39 parts water, 0.44 parts of acetic acid, 1.07 parts benzenesulfonic acid, 0.11 parts of 1,3,5-trimethyl-2,4,6-tris-[3,5-di-tert-butyl-4-hydroxybenzyl]benzene, are warmed to 240° C. in a closed vessel provided with stirrer; the autogeneous pressure is of at least 3 atm., and such conditions are maintained for 2 hours. Subsequently, the pressure is progressively decreased reaching a 250 mmHg residual pressure within 3 hours. The produced (precursor) polymer shows the following data: $\eta_r=1.9$; Carboxy groups=110 eq/10$^6$ g; M$_n$ (Average number molecular weight)=10,000.

10.27 parts polyethylene glycol of average m.w.=2,000, 0.23 parts potassium titanoxide oxalate dihydrate and 0.17 parts 1,3,5-trimethyl-2,4,6-tris[3,5-di-tert-butyl-hydroxybenzyl]benzene are added to the reaction vessel.

Subsequently, pressure is progressively decreased to 0.3 mm Hg and kept at this value for 3 hours.

The cooled and granulated polymer is washed 4 times with 95° C. water; after drying it shows the following data:

| relative moisture | 0.02% |
|---|---|
| $\eta_{rel}$ | 2.30 |
| $\eta_{poise}$ | 3,700 |
| free amino groups | 4 eq/10$^6$ g |
| total amino groups | 35 eq/10$^6$ g |
| acid groups | 33 eq/10$^6$ g |
| polyethylene glycol content | 7.0% |
| conversion to (A—B—A—) structure (calculated from the difference between polymer COOH and precursor COOH) | 70% |

The copolyamide was spun and stretched for comparison to polyamide 6. The filaments show the following properties:

| MEASURES | Polyamide 6 fiber' = 40 NH$_2$ | Hydrophilic fiber made of the polymer according to this invention |
|---|---|---|
| Titer d TEX | 77.7 | 76.1 |
| Strength cN/TEX | 44.8 | 42.0 |
| Modulus cN/TEX | 248 | 218 |
| Elongation % | 31.9 | 40.6 |
| Shrinking in 100° C. water, % | 12.6 | 12.8 |
| Tinctorial absorption to saturation % | 2 | 2 |
| Moisture % when saturated in a condition surrounding - 20° C.- Rel. Moist. 95% | 8.7 | 15.4 |

EXAMPLE 2

Preparation of a hydrophylic copolyamide wherein amino groups-terminated PEG is directly treated with adipic acid and water.

The polymer obtained by reaction of diaminic PEG and dicarboxylic polyamide shows random block distribution within the macromolecular chains: the properties (modulus, % shrinkage) of the filament are decidedly lower than for a comparable polyamide filament or (A-B-A) copolyamide filament of example 1.

113 parts caprolactam, 3.39 parts water, 0.91 parts adipic acid, 10.27 parts terminal-amino-groups-modified-PEG, 0.28 parts 1,3,5-trimethyl-2,4,6,-tris[3,5-di-tert-butyl-4-hydroxybenzyl]benzene are warmed to 240° C. in a closed vessel under stirring; autogenous pressure is at least 3 atm. and such conditions are maintained for 2 hours.

Subsequently, pressure is steadily decreased in the vessel to reach a 250 mm Hg residual pressure within 3 hours, and at this value it is maintained for 4 hours.

The polymer is cooled and granulated, washed 4 times with 95° C. water; after drying it shows the following characteristics:

| relative moisture | 0.02% |
|---|---|
| $\eta_{rel}$ | 2.40 |
| $\eta_{poise}$ | 4,300 |
| amino groups | 31 eq/10$^6$ g |
| acid groups | 37 eq/10$^6$ g |
| polyethylene glycol content | 6.8% |

The polymer was spun and stretched as in example 1.

The obtained filament shows the following properties.

| MEASURES | Polyamide 6 fiber | Hydrophilic fiber made of the polymer according to this example |
|---|---|---|
| Titer d TEX | 77.7 | 76.2 |
| Strength cN/TEX | 44.8 | 30.8 |
| Modulus cN/TEX | 248 | 152 |
| Elongation % | 31.9 | 46.5 |
| Shrinkage in H$_2$O at 100° C. | 12.6 | 16.4 |
| Tinctorial absorption to saturation % | 2 | 1.9 |
| Moisture % when sa- | | |

EXAMPLE 3
(COMPARATIVE)

Preparation of random block copolyamide, obtained adding polyethylene glycol 2,000 and esterification catalyst directly together with caprolactam: the obtained filament has mechanical and textile properties inferior to filament according to claim 1.

113 parts caprolactam, 3.39 parts water, 0.44 parts acetic acid, 1.07 part benzenesulfonic acid, 0.28 parts 1,3,5-trimethyl-2,4,6-tris[3,5-di-tert-butyl-4-hydroxybenzyl]benzene, 10.27parts polyethyleneglycol of 2,000 average molecular weight, 0.23 parts potassium titanoxide oxalate dihydrate are heated to 240° C. in a closed, stirred reaction vessel; autogenous pressure is at least 3 atm, and such conditions are maintained for 2 hours. Subsequently, pressure is steadily decreased in the vessel to reach 0.3 mm Hg residual pressure within 5 hours and it is maintained at this level for 3 hours.

The cooled and granulated polymer is washed 4 times with 95° C. water; after drying it shows the following characteristics:

| | |
|---|---|
| relative moisture | 0.02% |
| $\eta_{rel}$ | 2.30 |
| $\eta_{poise}$ | 4,500 |
| free amino groups | 3 eq/$10^6$ g |
| total amino groups | 35 eq/$10^6$ g |
| carboxy groups | 34 eq/$10^6$ g |
| PEG content | 7.1% |

The polymer was spun for comparison to polyamide 6, and the obtained filament had the following characteristics:

| MEASURES | Polyamide 6 fiber | Hydrophilic fiber made of the polymer according to this example |
|---|---|---|
| Titer d TEX | 77.7 | 76.0 |
| Strength cN/TEX | 44.8 | 31.5 |
| Modulus cN/TEX | 248 | 148 |
| Elongation % | 31.9 | 44.0 |
| Shrinkage in H$_2$O at 110° C. | 12.6 | 17.2 |
| Tinctorial absorption to saturation % | 2 | 1.9 |
| Moisture % when saturated in a conditioned surrounding-t 20° C. - Rel. moist. 95% | 8.7 | 14.5 |

EXAMPLES 4–5
(COMPARATIVE)

Preparation of hydrophilic block copolyamide (A-B-A) with the use of tetravalent Ti or Zr catalyst.

The polymer shows a high viscosity in the molten state and is unsuitable to be worked into filament.

The procedure of example 1 is used, but employing titanium tetrabutoxide (0.22 parts) and a zirconium tetraderivative (0.21 parts).

The polymer shows the following characteristics:

| MEASURES | Ti-derivative | Zr-derivative |
|---|---|---|
| Relative moisture % | 0.030 | 0.027 |
| $\eta_{rel}$ | 2.37 | 2.35 |
| $\eta_{poise}$ | 8,700 | 7,900 |
| Free terminal amino groups | 3 eq/$10^6$ g | 3 eq/$10^6$ g |
| Total terminal amino groups | 35 eq/$10^6$ g | 35 eq/$10^6$ g |
| Terminal acid groups | 39 eq/$10^6$ g | 40 eq/$10^6$ g |
| Polyethylene glycol content | 7.2% | 7.4% |

The polymer was fed to the spinning machine. At 260° C. formining the polymer in a thread (spinning test) is impossible; at 280° C. extrusion is feasible, but picking up the thread is impossible.

EXAMPLE 6
(COMPARATIVE)

Preparation of hydrophilic (A-B-A) block copolyamide through coploycondensation of PEG with polamide precursor having carboxy terminal groups: the filament has amino groups in an amount insufficient for dyeing.

100 parts of the obtained polyamide 6 terminating with dicarboxy groups as described in example 2 are reacted with 10.27 parts of M.W. 2,000 polyethylene glycol.

The vessel, at 250° C. and under stirring, is smoothly brought down to a 0.3 mm Hg residual pressure and kept under such conditions for 3 hours.

Once cooled and granulated, the polymer is washed 4 times with 95° C. water; after drying it shows the following characteristics:

| | |
|---|---|
| $\eta_{rel}$ | 2.32 |
| NH$_2$ | 2 eq/$10^6$ g |
| COOH | 45 eq/$10^6$ g |
| PEG % | 7.3 |

Conversion to (A-B-A) structure ≈ 67% (between PEG % determination).

EXAMPLE 7
(COMPARATIVE)

Preparation of a hydrophilic polymer according to this invention but using a monocarboxy acid only (Ka of between $10^{-5}$ and $10^{-4}$): the produced thread is undyeable when using conventional methods adopted for polyamide fibers, evidencing that additional use of an acid of Ka $\geq 10^{-1}$ as a m.w. regulator is necessary.

113 parts caprolactum, 3.39 parts water, 0.68 parts acetic acid, 0.11 parts of 1,3,5-trimethyl-2,4,6-tris[3,5-di-tert-butyl-4-hydroxybenzyl]benzene are reacted according to the process of the invention as described in example 1.

The granulated polymer, after washing 4 times with 95° C. water and subsequent drying, shows the following characteristics:

| | |
|---|---|
| relative moisture % | 0.03 |
| $\eta_{rel}$ in $H_2SO_4$ | 2.30 |
| $\eta_{poise}$ at 260° C. ($\Gamma = 11$) | 1,900 |
| amino groups | 9 eq/$10^6$ g |
| acid groups | 37 eq/$10^6$ g |
| polyethylene glycol content | 7.4% |
| conversion to (A—B—A—) structure | ~70% |

The polymer was spun and stretched as in example 1 and compared to polyamide 6.

The thread shows the same properties as thread of example 1, but the obtained stocking is undyeable.

EXAMPLE 8

(COMPARATIVE)

Evidence is seen that a reaction between carboxyterminated PEG and hydrophilic amino-terminated copolyamide is hindered by thermal instability of the former; the reation does not take place.

113 parts caprolactam, 3.39 parts water, 1.03 parts benzylamine, 0.11 parts of 1,3,5-trimethyl-2,4,6-tris[3,5-di-tert-butyl-4-hydroxybenzyl]benzene are subjected to the process of Example 1, but with the use of carboxyterminated polyethylene glycol in the same amount as for polyethylene glycol in Example 1.

The obtained polymer has the following characteristics:

| | |
|---|---|
| relative moisture | 0.03% |
| $\eta_{rel}$ | 2.07 |
| $\eta_{poise}$ | 800 |
| amino groups | 99.8 eq/$10^6$ g |
| carboxy groups | 14.5 eq/$10^6$ g |
| PEG content | 7.4% |

What is claimed is:

1. A textile fiber or filament made of a linear block copolymer of a regular structure, comprising polycaproamide and polyethylene glycol blocks, said polyethylene glycol blocks being produced from polyethylene glycol having terminal hydroxy or amino groups, said block copolymer comprising two polycaproamide blocks (A) bound to each other through an intermediate polyethyleneglycol block (B) according to a structural scheme (A-B-A).

2. The textile fiber or filament according to claim 1, wherein the polyamide blocks have a number average molecular weight of between 5,000 and 15,000, and the polyethyleneglycol blocks have a number average molecular weight of between 600 and 10,000.

3. The textile fiber or filament according to claim 1, wherein block (B) is bound to each one of the (A) blocks by an ester CO—O bond.

4. The textile fiber or filament according to claim 1, wherein block (B) is bound to each one of the (A) blocks by an amide —CO—NH— bond.

5. The textile fiber or filament according to claim 1, wherein polyamide blocks (A) have their free ends terminated with amino groups blocked by groups that separate under dyeing conditions.

6. The textile fiber or filament according to claim 1, wherein the blocking groups are sulfonic groups.

7. The textile fiber or filament according to claim 1, having a viscosity of between 1,000 and 5,000 poises.

8. Textile fiber or filament according to claim 1, having a moisture absorption of between 13 and 17% after saturation at 20° C. and 95% relative moisture.

9. The textile fiber or filament according to claim 2 wherein the polyamide blocks have a number average molecular weight of between 7,000 and 12,000 and the polyethyleneglycol blocks have a number molecular weight of between 1,000 and 5,000.

* * * * *